(12) United States Patent
Pinsenschaum et al.

(10) Patent No.: US 8,282,125 B2
(45) Date of Patent: Oct. 9, 2012

(54) SIDE CURTAIN AIRBAG

(75) Inventors: Ryan T. Pinsenschaum, Dayton, OH (US); Michael F. Fink, Mesa, AZ (US); Mark T. Winters, Troy, OH (US)

(73) Assignee: Nxgen Technologies, LLC, Mesa, AZ (US)

(*) Notice: Subject to any disclaimer, the term of this patent is extended or adjusted under 35 U.S.C. 154(b) by 62 days.

(21) Appl. No.: 12/859,529

(22) Filed: Aug. 19, 2010

(65) Prior Publication Data

US 2011/0042924 A1 Feb. 24, 2011

Related U.S. Application Data

(60) Provisional application No. 61/235,328, filed on Aug. 19, 2009.

(51) Int. Cl.
*B60R 21/16* (2006.01)

(52) U.S. Cl. .................................... 280/730.2

(58) Field of Classification Search ............... 280/730.2, 280/743.1, 743.2
See application file for complete search history.

(56) References Cited

U.S. PATENT DOCUMENTS

| | | | |
|---|---|---|---|
| 6,199,898 B1* | 3/2001 | Masuda et al. | 280/730.2 |
| 6,554,314 B1* | 4/2003 | Uchiyama et al. | 280/730.2 |
| 6,612,612 B2* | 9/2003 | Zerbe | 280/730.2 |
| 6,860,507 B2* | 3/2005 | Uchiyama et al. | 280/730.2 |
| 6,883,826 B2* | 4/2005 | Fujiwara | 280/730.2 |
| 7,404,572 B2* | 7/2008 | Salmo et al. | 280/729 |
| 7,762,575 B2 | 7/2010 | Jang et al. | |
| 7,784,823 B2* | 8/2010 | Heigl et al. | 280/730.2 |
| 2006/0033314 A1 | 2/2006 | Karlbauer et al. | |

FOREIGN PATENT DOCUMENTS

| | | |
|---|---|---|
| GB | 2 312 877 A | 11/1997 |
| JP | 2002019567 A | 1/2002 |
| JP | 2007076517 A | 3/2007 |
| KR | 100736464 B1 | 6/2007 |

OTHER PUBLICATIONS

International Search Report dated May 30, 2011 for International Application No. PCT/US2010/046036.
Written Opinion dated May 30, 2011 for International Application No. PCT/US2010/046036.

* cited by examiner

*Primary Examiner* — Faye M. Fleming
(74) *Attorney, Agent, or Firm* — Cantor Colburn LLP

(57) ABSTRACT

An inflatable cushion for a side of a vehicle is provided, the inflatable cushion, having at least one inflatable cell proximate to an end of an inflatable portion of the inflatable cushion, the least one inflatable cell being defined by a first layer of cushion fabric secured to a second layer of cushion fabric; a single sheet of fabric secured to either the first layer or second layer of cushion fabric defining the at least one inflatable cell, the single sheet of fabric defining a non-inflatable portion of the inflatable cushion and wherein a substantial portion of the single sheet of fabric traverses the at least one inflatable cell and is tangent to a face of the at least one inflatable cell when it is inflated such that upon inflation of the at least one inflatable cell tension is created in the single sheet of fabric.

20 Claims, 9 Drawing Sheets

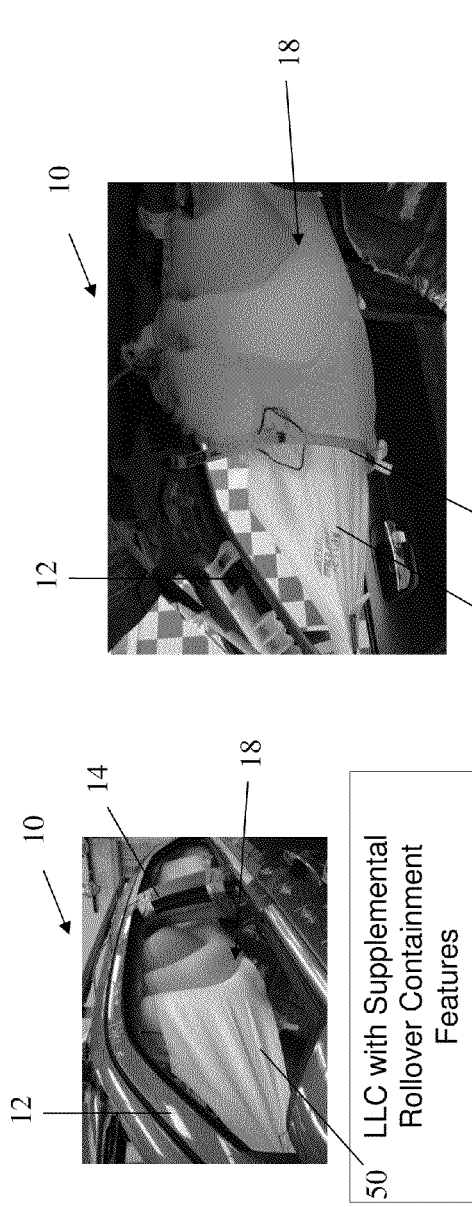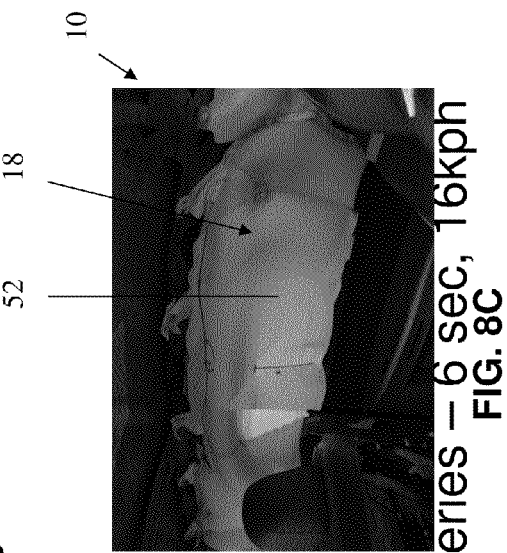
NHTSA Containment Test Series – 6 sec, 16kph

SIDE CURTAIN AIRBAG

CROSS REFERENCE TO RELATED APPLICATIONS

This application claims the benefit of U.S. Provisional Patent Application Ser. No. 61/235,328 filed Aug. 19, 2009, the contents of which are incorporated herein by reference thereto.

BACKGROUND

Exemplary embodiments of the present invention relate generally to a side impact or rollover inflatable curtain airbag.

Various side impact or rollover airbags (also referred to as side curtains or curtain airbags) provide a cushion between a side of a vehicle and the occupant.

Accordingly, it is desirable to provide a side impact or rollover restraint system having an inflatable curtain airbag that reduces vehicle development complexity, reduces vehicle build complexity and improves cost effectiveness.

SUMMARY OF THE INVENTION

In accordance with an exemplary embodiment of the present invention an inflatable cushion for a side of a vehicle is provided, the inflatable cushion, having at least one inflatable cell proximate to an end of an inflatable portion of the inflatable cushion, the least one inflatable cell being defined by a first layer of cushion fabric secured to a second layer of cushion fabric; a single sheet of fabric secured to either the first layer or second layer of cushion fabric defining the at least one inflatable cell, the single sheet of fabric defining a non-inflatable portion of the inflatable cushion and wherein a substantial portion of the single sheet of fabric traverses the at least one inflatable cell and is tangent to a face of the at least one inflatable cell when it is inflated such that upon inflation of the at least one inflatable cell tension is created in the single sheet of fabric.

In another exemplary embodiment, an airbag module for a vehicle is provided, the airbag module having: an inflatable cushion, the inflatable cushion having: at least one inflatable cell proximate to an end of an inflatable portion of the inflatable cushion, the least one inflatable cell being defined by a first layer of cushion fabric secured to a second layer of cushion fabric; a single sheet of fabric secured to either the first layer or second layer of cushion fabric defining the at least one inflatable cell, the single sheet of fabric defining a non-inflatable portion of the inflatable cushion and wherein a substantial portion of the single sheet of fabric traverses the at least one inflatable cell and is tangent to a face of the at least one inflatable cell when it is inflated such that upon inflation of the at least one inflatable cell tension is created in the single sheet of fabric; and an inflator for inflating the inflatable cushion.

In still another exemplary embodiment, a method for providing tension to a non-inflatable portion of an inflatable cushion is provided, the method including the steps of: securing a first layer of cushion fabric to a second layer of cushion fabric to define at least one inflatable cell proximate to an end of an inflatable portion of the inflatable cushion; and securing a single sheet of fabric secured to either the first layer or second layer of cushion fabric defining the at least one inflatable cell, the single sheet of fabric defining the non-inflatable portion of the inflatable cushion and wherein a substantial portion of the single sheet of fabric traverses the at least one inflatable cell and is tangent to a face of the at least one inflatable cell when it is inflated such that upon inflation of the at least one inflatable cell tension is created in the single sheet of fabric.

BRIEF DESCRIPTION OF THE DRAWINGS

FIGS. 8A-8C are additional views of exemplary embodiments of the present invention.

DETAILED DESCRIPTION OF EXEMPLARY EMBODIMENTS

Reference is made to the following patent applications U.S. Patent Publication Nos. 2006-0017267 and 2009-0127837 and U.S. patent application Ser. Nos. 12/780,411 filed May 14, 2010; 12/813,910 filed Jun. 11, 2010; 12/815,809 filed Jun. 15, 2010; 12/818,309 filed Jun. 18, 2010 the contents each of which are incorporated herein by reference thereto.

Referring now to the FIGS. and at least FIGS. 1-8, exemplary embodiments of the present invention are illustrated. As will be discussed herein, a side-curtain airbag that provides improvement in occupant containment performance is provided.

Reference will now be made in detail to exemplary embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
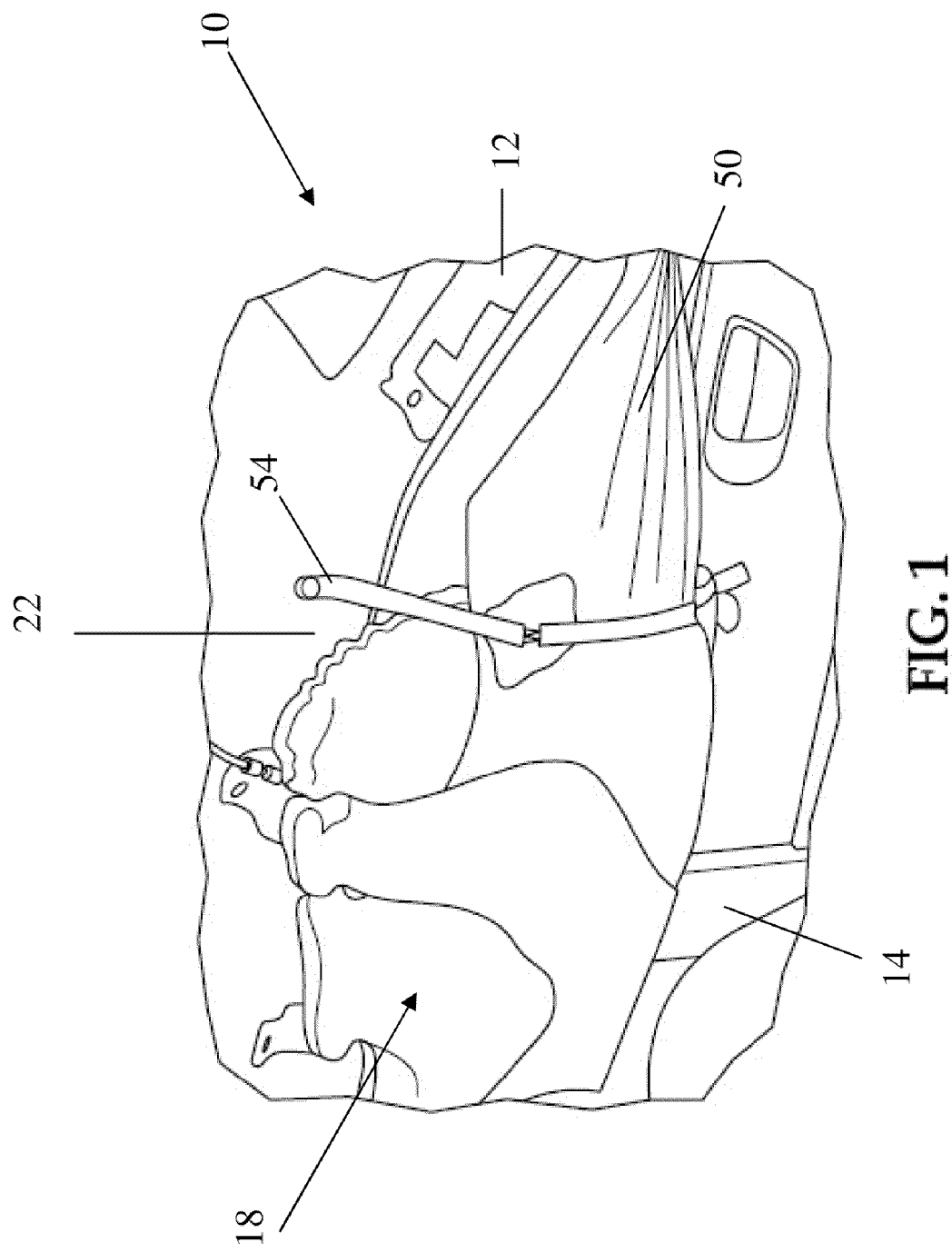
FIG. 1 is a front row inboard view of an exemplary embodiment of the present invention.
Figure 2:
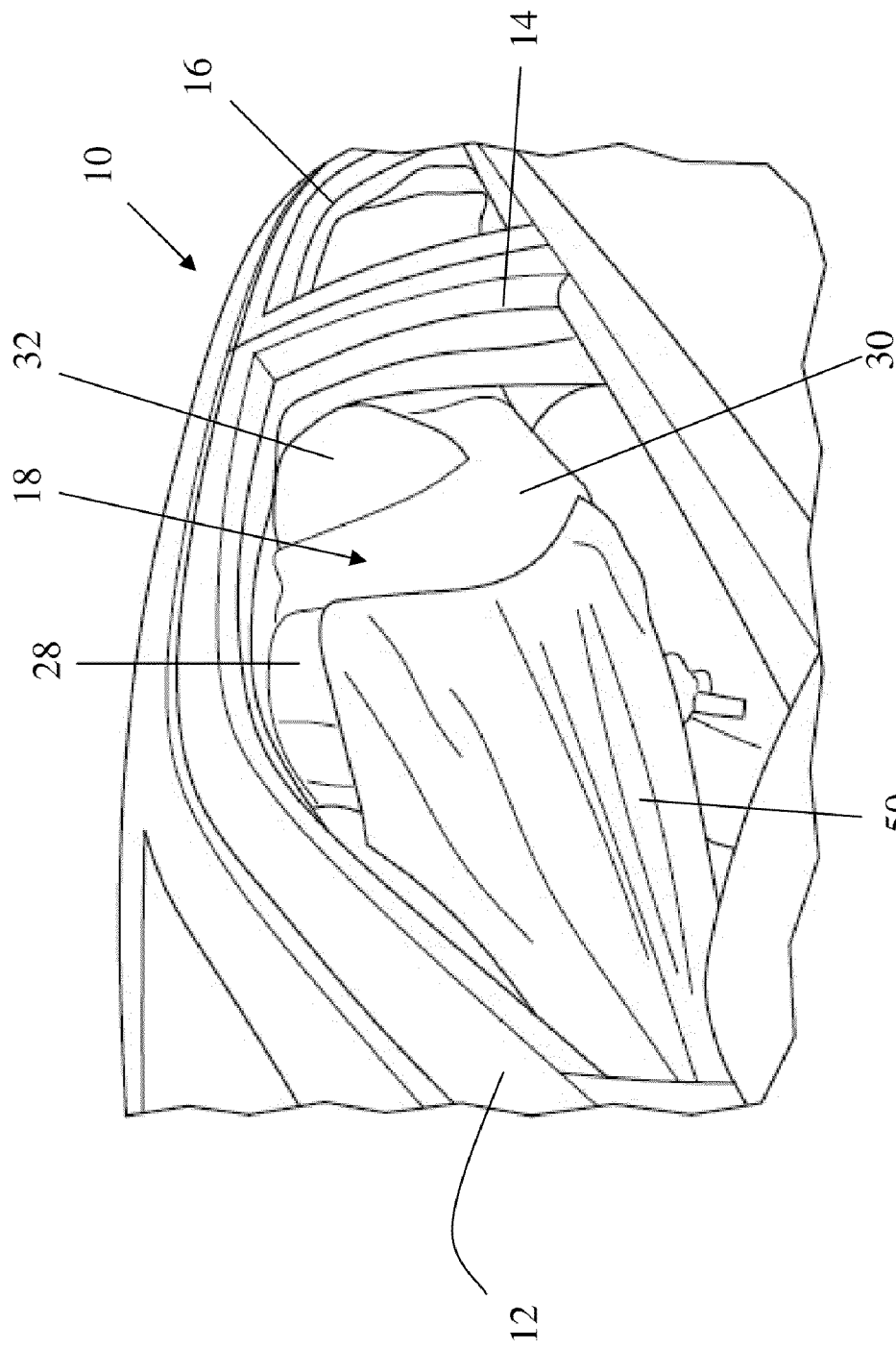
FIG. 2 is a front row outboard view of an exemplary embodiment of the present invention.
Figure 3:
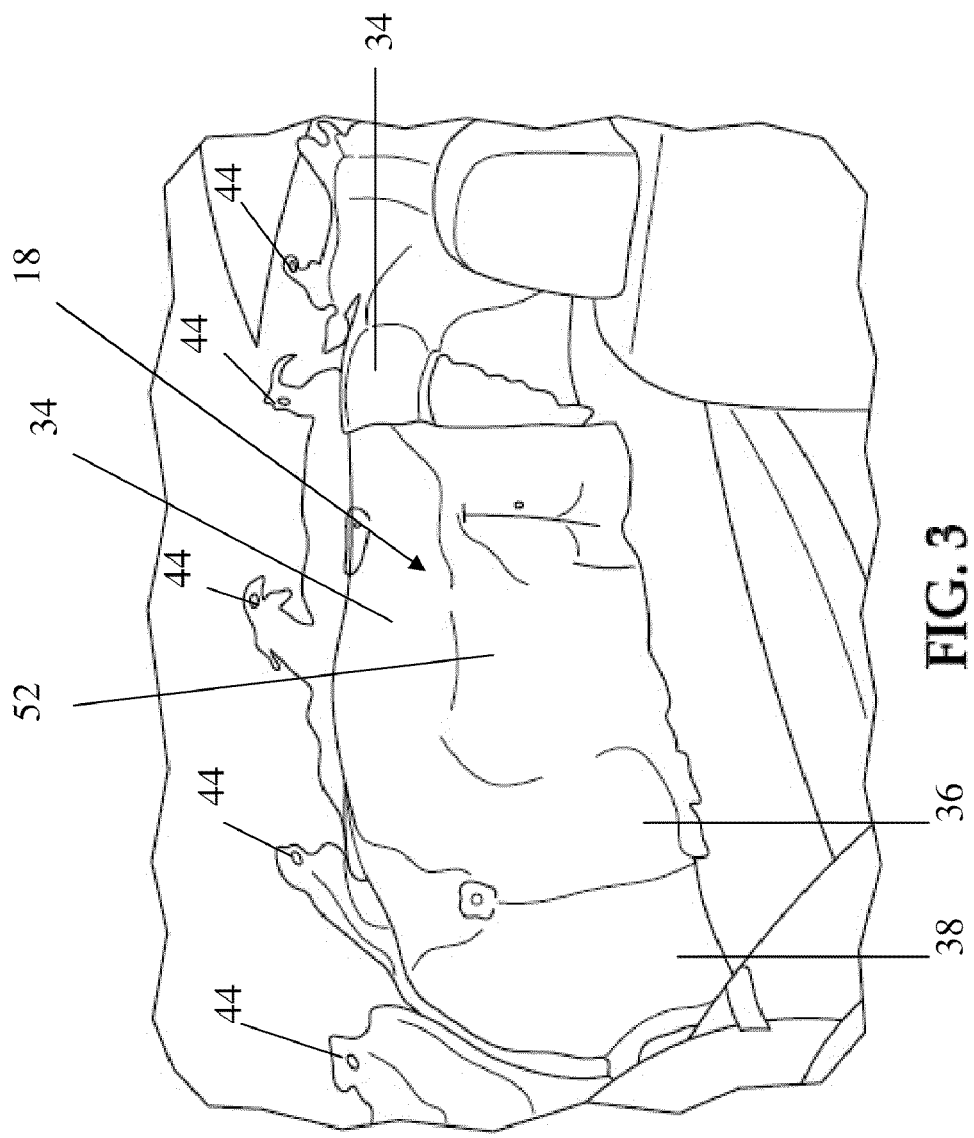
FIGS. 3 and 4 are rear row inboard views of an exemplary embodiment of the present invention.

Referring to the drawings, portions of a vehicle 10 is shown. Vehicle 10 includes an A-pillar 12, a B-pillar 14, and a C-pillar 16. A side curtain airbag 18 in accordance with one exemplary embodiment of the present invention is also illustrated and extends between A-pillar 12 and C-pillar 16. In FIG. 1, airbag 18 is shown in an inflated state. In this regard, an inflator 11 provides a gas necessary to inflate airbag 18. The inflator may be located in any suitable location such as the B-pillar, in the C-pillar, in the roof, or another location within vehicle 10.

Before airbag 18 is deployed, it may be stored within a roof rail 22 of vehicle 10. Optionally, tethers 24 and 26 may be used to restrain airbag 18. In the embodiment shown in FIG.

7, tethers 24 and 26 attach at one end to airbag 18 and at the other end to the body of the vehicle.

Airbag 18 is defined by a first layer of cushion fabric secured to a second layer of cushion fabric and includes a plurality of cells 28, 30 and 36 and 38. Cells 28, 30, and in some embodiments 32 make up a forward bank of cells between A-pillar 12 and B-pillar 14, while cells 36 and 38 make up a rear bank of cells between B-pillar 14 and C-pillar 16. In one embodiment, the areas or cells identified as 32 and 34 may merely be conduits or a single conduit that traverse between the forward bank and the rearward bank and may be used to provide fluid communication between the two or in alternative embodiments areas 32 and 34 may be separate cells or still in another embodiment completely removed. It being understood that the cell configuration is determined and varies by the vehicle and/or applications contemplated for the airbag. In another embodiment the airbag may be constructed from a one piece woven construction. In one exemplary embodiment airbag 18 may be constructed using the teachings of U.S. Patent Publication Nos. 2006-0017267 and 2009-0127837 and U.S. patent application Ser. Nos. 12/780,411 filed May 14, 2010; 12/813,910 filed Jun. 11, 2010; 12/815,809 filed Jun. 15, 2010; 12/818,309 filed Jun. 18, 2010 the contents each of which are incorporated herein by reference thereto. Of course, other airbag constructions are contemplated for use with exemplary embodiments of the present invention.

A plurality of tabs 44 are provided to attach airbag 18 to roof rail 22. Instead of tabs 44, any suitable method of attachment may be used. A delivery tube (not shown) provides the inflation gas to the airbag 18 from the inflator.

Some portions of the side-curtain airbag can be un-inflated areas, such as areas 46 and 48 yet these areas may still be required to contain the occupant within the vehicle during a roll over accident. These un-inflated areas are typically located at the front and rear of the cushion and many times in the areas between rows of the vehicle. In one embodiment of the invention techniques are utilized to make the un-inflated areas of the cushion less susceptible to occupant excursion through the window.

In a conventional side-curtain air bag inflatable cells are in areas directly adjacent to a properly seated occupant. Typically an un-inflated fabric, also referred to as a "sail panel" (46 in FIG. 6), is attached to the front edge of the inflated section and covers the remaining open area of a front window. Further, a tether is then attached to the sail panel to secure the cushion to a front mounting location in front of the vehicle doorframe. The rear of the cushion then may also incorporate a sail panel attached to the rear edge of the inflated area and then secured to a rear mounting location on the vehicle. As mentioned, the other area that typically includes an un-inflated area is between rows or an area connecting the edge of the front inflated area to the edge of the rear inflated area.

Although these sail panels are un-inflated, in the event of a rollover, an occupant may still be thrown into these areas. The degree of excursion the occupant will then undergo is likely to be more than if the occupant struck an inflated cushion area. The current invention thus employs countermeasures to decrease the degree of excursion should an occupant interact with these un-inflated areas. One of the ways to reduce the excursion has been to simply add inflated cells to those areas of contact, however typically this adds significant cost due to the requirement for premium fabric and additional inflator output. Another way would be to add significantly more pressure to the bag to increase tension in the un-inflated areas, but this doesn't always translate directly into increased containment performance with strikes in these areas.

One exemplary embodiment of the present invention utilizes low cost fabric to achieve the excursion reductions by strategically locating a sheet or "trampoline sail" 50, 52 of fabric having a portion or substantial portion overlapping an inflated cell or cells to create a "trampoline" type effect in an un-inflated zone. In various embodiments, multiple sheets or trampoline sails 50 and 52 may be used and in addition, these sheets may be placed either inboard or outboard of the inflatable cushion or on both the inboard and outboard sides. As used herein outboard refers to the surface of the inflatable cushion facing the exterior of the vehicle while inboard refers to the surface of the inflatable cushion facing the interior of the vehicle. It being understood that in one embodiment the inboard sheets 50 and 52 provide the trampoline effect since they are located on the inboard side of the inflatable cushion.

In addition, the sheets or trampoline sheets may be placed at either the forward or rearward ends or at both the forward and rearward ends of the inflatable cushion.

An additional countermeasure to assist the trampoline sail performance is by adding a vertical tether 54. This vertical tether attaches to a top edge or upper portion of the trampoline sheet on one end and the other end to the roof line of the vehicle. This vertical tether is used on the inboard trampoline sail. Further benefit can be gained by extending this vertical tether downward to the bottom outside corner of the inflated cell. This has been viewed to help stabilize and lift the cell more inboard. This vertical tether takes excess slack out of the trampoline sail and helps limit the total excursion possible (See at least FIG. 1). Although illustrated as being on the inboard side a vertical tether call also be on the outboard side for use with outboard trampoline sail. In one embodiment, the forward trampoline sail is secured to the vertical tether at a point of securement 51. Still further and in another embodiment, an additional sheet of fabric 53 is sewn to the trampoline sail by stitches 55 to provide a larger surface area for securement of the vertical tether to the trampoline sail.

Exemplary embodiments of the present invention utilize a "trampoline sail" that improves the occupant performance of the airbag as compared to conventional side curtain air bags by reducing the degree of occupant excursion in un-inflated areas of the curtain. With conventional side curtains the sail panels consist of a single layer of fabric attached to the edge of the inflated sections. This places the sail panel on the same plane as all the zero length tethers within the cushion (same as the sew line plane on the cushions perimeter). The present invention elevates the sail panel area to start on the same plane as the inflated height of the end cell. This is achieved by positioning a sheet of fabric over the cell directly adjacent to the sail panel or over the cell directly adjacent to where the sail panel would be typically placed. It being understood that the sheet of fabric or trampoline sail 50 can be used in addition to or in lieu of the sail panel 46 illustrated in the FIGS. The sheet of fabric or trampoline sail 50 is in one embodiment attached to the sheets forming the cell at the zero length inner seam 58 within the inflated region. (See at least FIG. 7.) As used herein zero length seam or zero length tether is construed as the point where the two sheets of fabric (inner and outer layer) of the inflatable cushion are secured together to form perimeter portions of the inflatable cells of the inflatable cushion or airbag with regard to the forward trampoline sail, the zero length tether point of securement is located between two inflatable cells. Of course, other locations are contemplated to be within the scope of exemplary embodiments of the present invention.

In alternative embodiments, the sheet of fabric or trampoline sail 50 can be secured directly to the cell as long as the desired trampoline effect is achieved although sewing to the surface of the cell may require sealing means to reduce gas leakage in the inflatable cell. By securing the sheet of fabric or trampoline sail to the inner seam 58 it is unlikely sealants or sealing means will be required.

Figure 7:
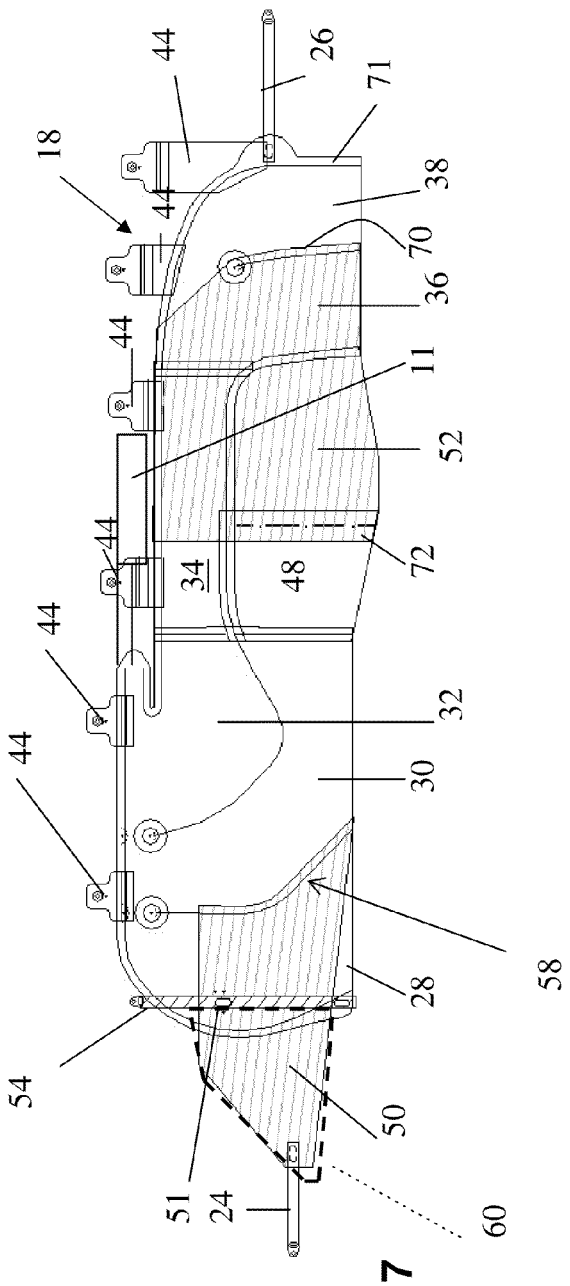
FIG. 7 is a side view of a side curtain airbag in accordance with an exemplary embodiment of the present invention.
Figure 7A:
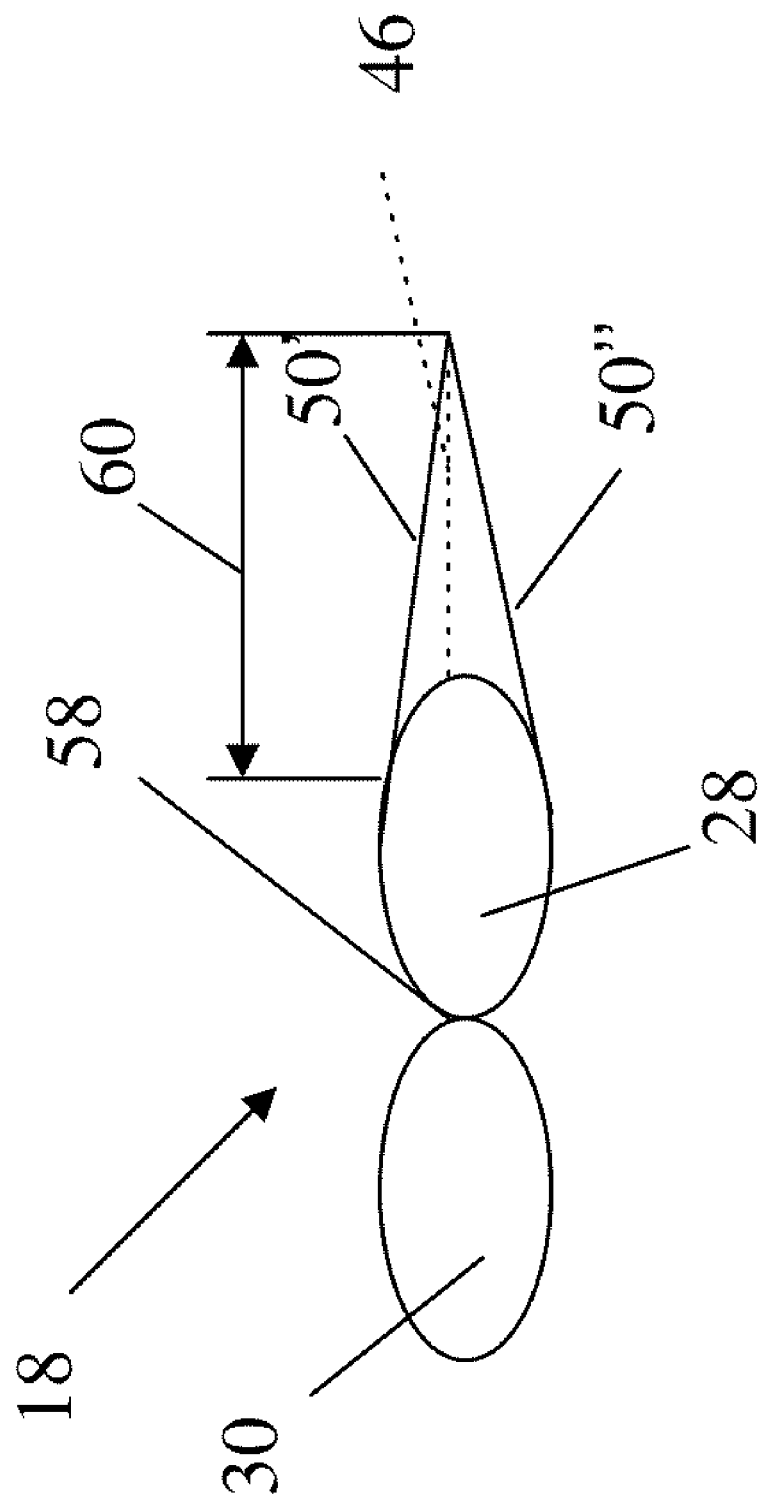
FIG. 7A is a cross sectional view of a portion of the side curtain illustrated in FIG. 7.
Figure 9:
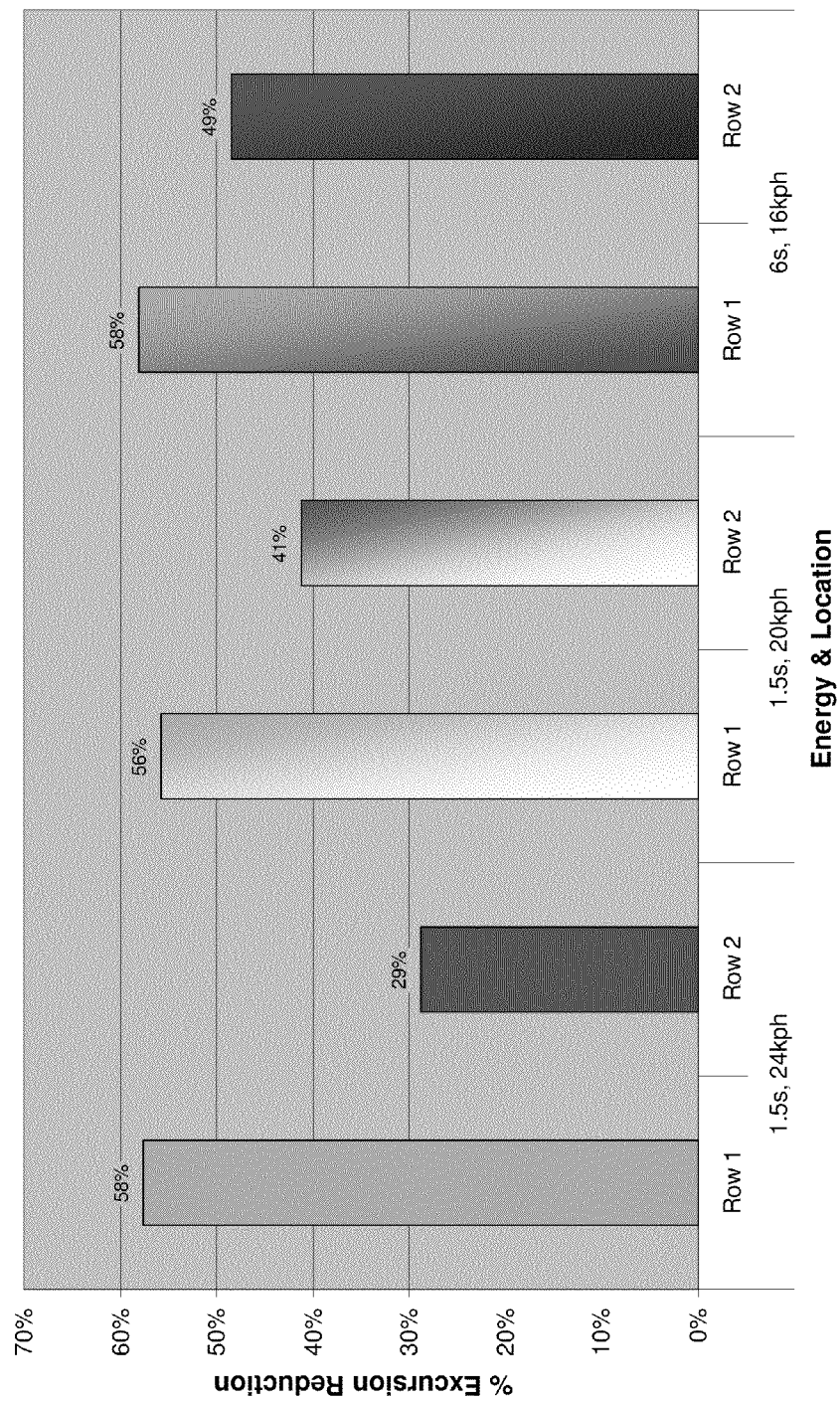
FIG. 9 is graph illustrating the percent of excursion reduction of an object past a window plane of a vehicle using an exemplary embodiment of the present invention as compared to a side airbag without the of non-inflatable portion of the present invention.

FIG. 7A is a partial cross-sectional view of the inflatable cushion illustrating the sheet of fabric or trampoline sail attached to the forward end of the inflatable cushion. Here an inboard sheet of fabric or trampoline sail 50' is illustrated while an outboard sheet of fabric, trampoline sail 50" is also illustrated. The dashed lines 46 show the typical location of the forward sail panel 46. As shown, the sheet of fabric or trampoline sail 50' or 50" located above the plane upon which the forward sail panel 46 is located. Area 60 is also illustrated to show that the trampoline effect achieved by the sheet of fabric or trampoline sail extends partially over the inflatable cushion 28. As mentioned above and herein exemplary embodiments contemplate numerous variations of inboard and outboard sheets of fabric or trampoline sails alone or in combination with each other as well as alone or in combination with sail panel 46. Similarly sheet of fabric or trampoline sail 52 is also contemplated to be used or in combination with each other as well as alone or in combination with panel 48.

By causing the trampoline sail to traverse or be tangent to a surface of the inflatable cell at least two positive effects are provided. First the sheet of fabric increases in tension once the cell is inflated and second the sheet is also lifted by the inflatable cushion to create a "trampoline effect" in an area of the sheet of fabric. One non-limiting location is the sail panel area 60 illustrated in FIGS. 7 and 7A. Here and depending upon the curvature of the forward end of inflatable cell the fabric is secured to (cell 28) the trampoline effect may being over inflatable portions of the cushion and extend to un-inflated portions of the cushion. Both of these result in increased containment performance for the occupant in the un-inflated areas of the cushion where the trampoline effect is present. The effects of this improvement have also been noted to transfer into inflated areas due to increased overall tension in the cushion, however the most significant enhancements are realized in the un-inflated regions. Of course, the sheet may be secured in other locations than those illustrated in the FIGS.

The "trampoline" effect allows for interaction with the occupant sooner than would be the case with a conventional sail panel or un-inflated area in particular and in embodiments wherein the "trampoline sail" or sheet is attached to the inboard side of the inflatable cushion.

This is evident since the trampoline sheet runs tangent to the face(s) of the inflated adjacent cell as opposed to a conventional sail panel that originates at the un-inflated edge or perimeter of the end cell. See FIG. 6 versus FIGS. 7 and 7A.

It has also been discovered that adding an additional sheet of fabric to the outboard side of the cell provides a further performance advantage. It appears having the trampoline fabric on the inboard cushion face does increase performance by itself but has a tendency to twist this end cell outboard which can decrease the overall effectiveness. By incorporating a trampoline sheet of fabric on the outboard cell face as well, it pulls the cell back inboard or neutralizes any cross vehicle cell bias, thus allowing the trampoline sail to have enhanced overall performance (See at least FIG. 2).

Referring now to FIG. 1, this particular figure shows the trampoline sheets covering a portion of the front row cell and is sewn to its zero length inner seam (e.g., the seam between two cells). The other edge of the sheet is then sewn to a front tether strap at a determined location that provides an overall tightness to both trampoline sheets once the cushion is inflated.

These sheets of trampoline fabric are not required to hold gas, so inexpensive fabric may be utilized. For instance and in one non-limiting exemplary embodiment, an uncoated 640 denier fabric may be used for the trampoline sheets. Of course, other fabric types may be used.

The same type of trampoline fabrics can also be used in the un-inflated sail panel area occurring between vehicle rows. For example, the sheet fabric is placed over a rear row inflatable cell adjacent to the middle sail area and sewn into the zero length inner seam 70 of that cell. Again, for most effectiveness this can be done on both outboard and inboard cell faces or alternatively just on the inboard side. The other end of the fabric(s) is attached approximately to a mid-portion 72 of the remaining un-inflated area 48. Other attachment points within the mid sail panel area may prove effective as well. From that point a single sheet of fabric can be used to join the remaining un-inflated area to the edge of the inflatable cell in the front row area. In this embodiment the top edge of the trampoline sheet is also attached to a top edge of the curtain air bag to obtain additional tightness to the trampoline sheet(s) once inflated (See at least FIG. 3.). In another alternative embodiment, the sheet fabric or trampoline sheet is secured to the outer perimeter seam 71 of the rear portion of the cushion and is placed over the rear row inflatable cell adjacent to the middle sail area, here the sheet may traverse both cells 36 and 38 or alternatively only a single cell if the area occupied by cells 36 and 38 is reduced to a single cell. Of course, it is also contemplated that more than two cells can be used for the rear portion of the airbag.

Figure 4:
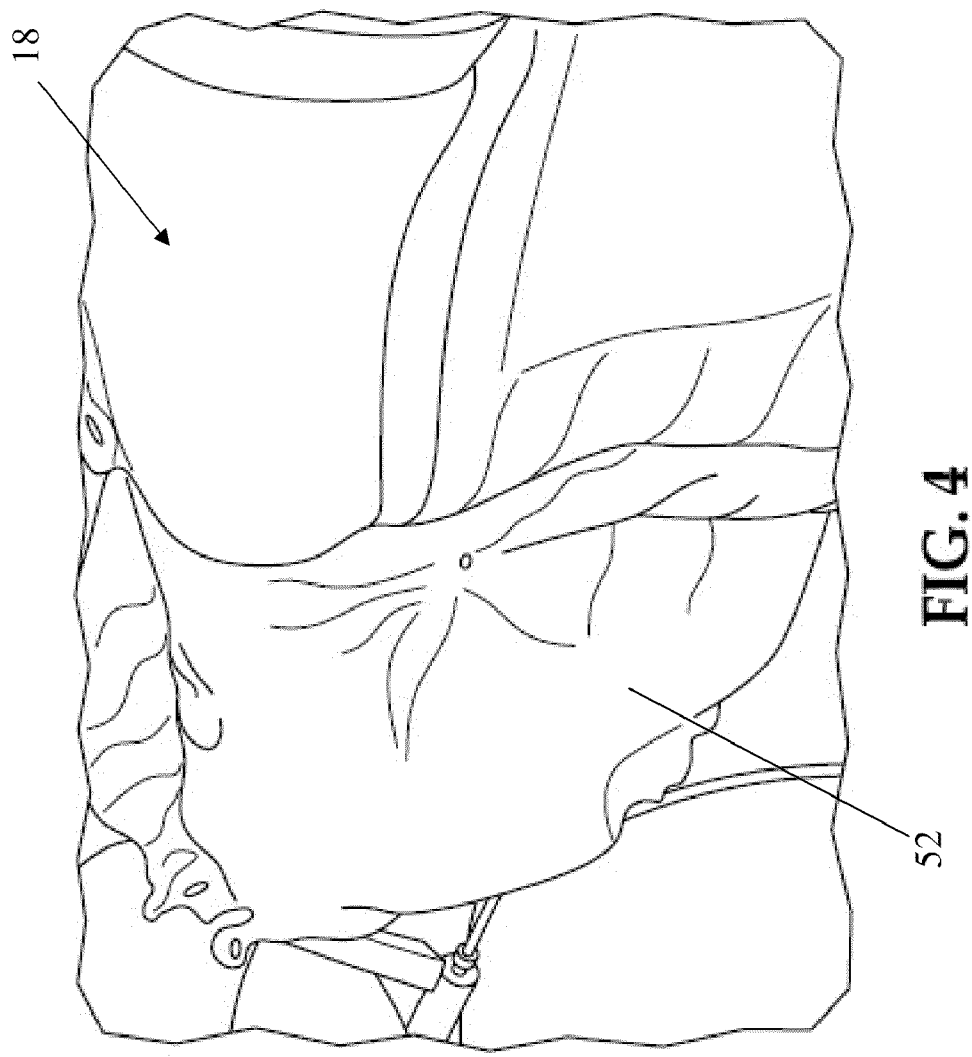
Figure 5:
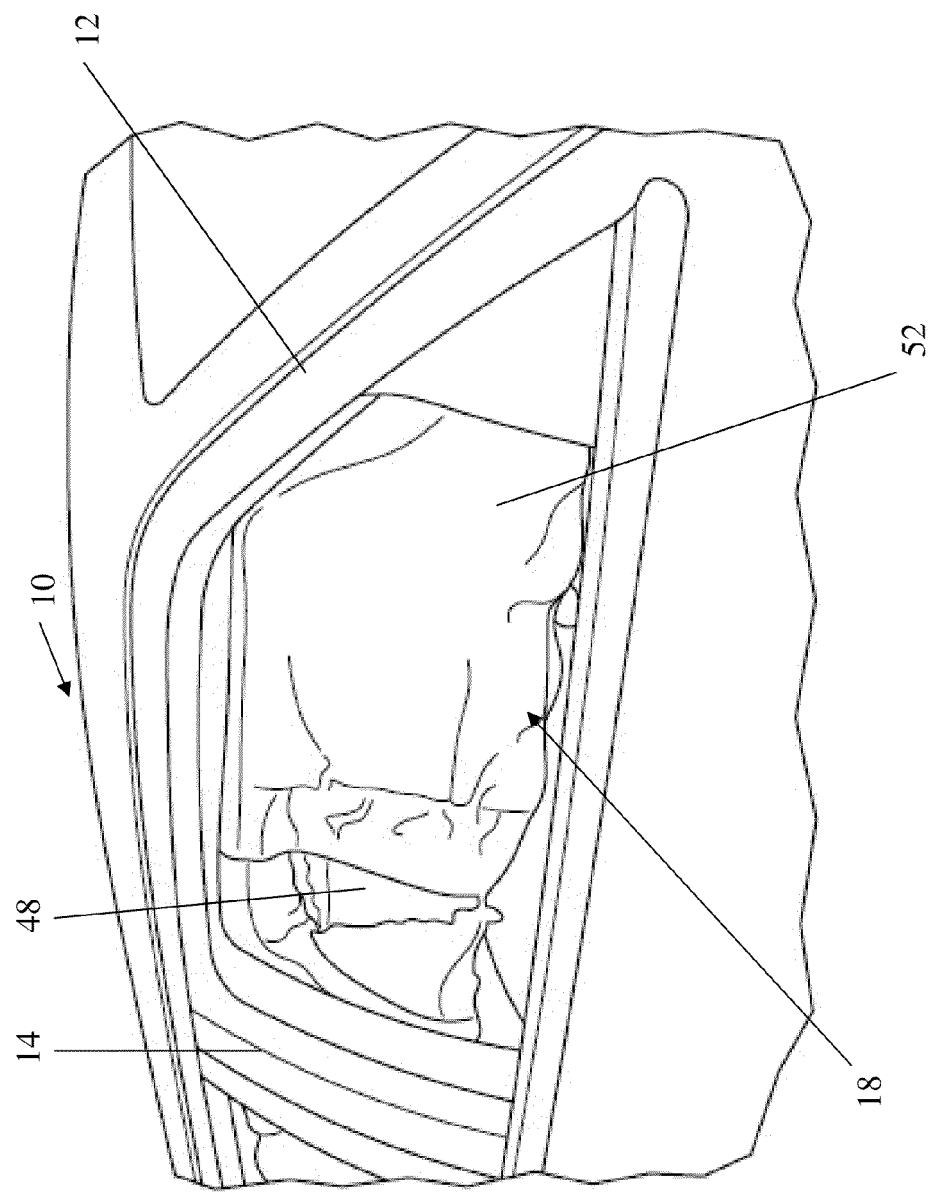
FIG. 5 is a rear row outboard view of an exemplary embodiment of the present invention.
Figure 6:
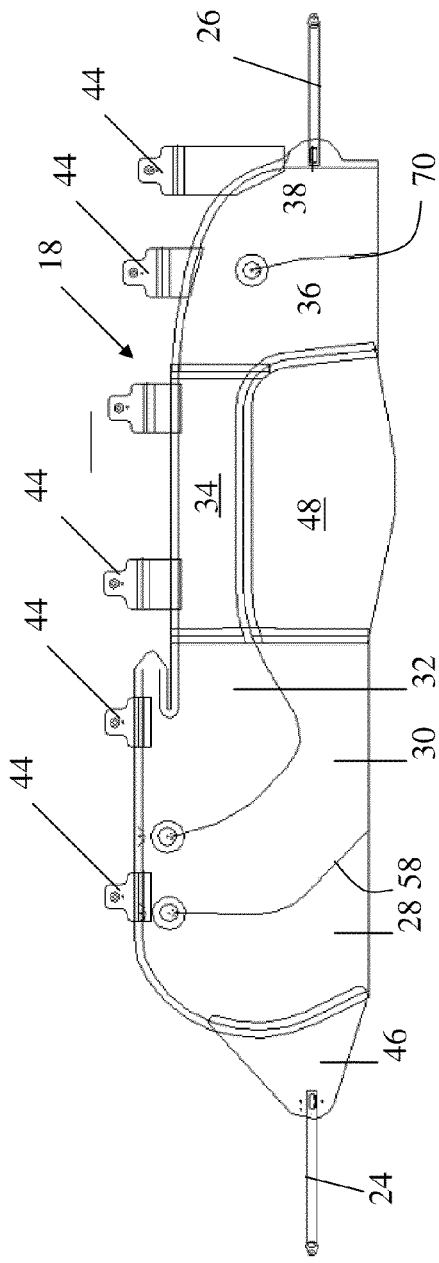
FIG. 6 is a side view of a side curtain airbag.

It is important to sew the trampoline sheets so that upon inflation they become quite taught in order to provide the additional resistance against occupant excursion (See at least FIG. 4).

Exemplary embodiments of the present invention apply an unconventional approach wherein modifications are applied to an airbag however the existing inflated cushion area is used and adjustments made only to un-inflated components of cushion, wherein a trampoline effect is provided.

The "trampoline" effect allows for interaction with the occupant sooner than would be the case with a conventional sail panel or un-inflated area. This is evident since the trampoline sheet runs tangent to the face(s) of the inflated adjacent cell as opposed to a conventional sail panel that originates at the un-inflated edge or perimeter of the end cell.

Moreover, exemplary embodiments provide increased robustness of certain low leak cushion systems as well as providing potential for additional flexibility in the airbag module development. For example, certain designs provide for the use of lower cost fabrics and/or smaller inflated cell(s) as well as the ability to use various types of inflation gases.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An inflatable cushion for a side of a vehicle, the inflatable cushion, comprising:
   at least one inflatable cell proximate to an end of an inflatable portion of the inflatable cushion, the least one inflatable cell being defined by a first layer of cushion fabric secured to a second layer of cushion fabric;

a single sheet of fabric secured to the inflatable cushion, the single sheet of fabric defining a non-inflatable portion of the inflatable cushion and wherein a portion of the single sheet of fabric traverses completely across a width of the at least one inflatable cell and is tangent to a face of the at least one inflatable cell when it is inflated such that upon inflation of the at least one inflatable cell tension is created in the single sheet of fabric and wherein the single sheet of fabric does not define the at least one inflatable cell.

2. The inflatable cushion as in claim 1, wherein the face of the at least one inflatable cell is an inboard face of the inflatable cell.

3. The inflatable cushion as in claim 1, wherein the single sheet of fabric is secured to a portion of the inflatable cushion wherein the first layer of cushion fabric is secured to the second layer of cushion fabric to define a seam disposed between the at least one inflatable cell and another inflatable cell of the inflatable cushion.

4. The inflatable cushion as in claim 1, further comprising a vertical tether, wherein the single sheet of fabric is secured to the vertical tether.

5. The inflatable cushion as in claim 4, wherein the vertical tether is secured to an additional sheet of fabric sewn to the single sheet of fabric by a plurality of stitches to provide a larger surface area for securement of the vertical tether to the single sheet of fabric.

6. The inflatable cushion as in claim 1, wherein the face of the at least one inflatable cell is an outboard face of the inflatable cell.

7. An inflatable cushion for a side of a vehicle, the inflatable cushion, comprising:

at least one inflatable cell proximate to an end of an inflatable portion of the inflatable cushion, the least one inflatable cell being defined by a first layer of cushion fabric secured to a second layer of cushion fabric; and a single sheet of fabric secured to either the first layer or second layer of cushion fabric defining the at least one inflatable cell, the single sheet of fabric defining a non-inflatable portion of the inflatable cushion and wherein a portion of the single sheet of fabric traverses the at least one inflatable cell and is tangent to a face of the at least one inflatable cell when it is inflated such that upon inflation of the at least one inflatable cell tension is created in the single sheet of fabric, wherein the face of the at least one inflatable cell is an inboard face of the inflatable cell and the inflatable cushion further comprises a second single sheet of fabric secured to either the first layer or second layer of cushion fabric defining the at least one inflatable cell, the second single sheet of fabric defining another non-inflatable portion of the inflatable cushion and wherein a portion of the second single sheet of fabric traverses the at least one inflatable cell and is tangent to an outboard face of the at least one inflatable cell when it is inflated such that upon inflation of the at least one inflatable cell such that tension is created in the second single sheet of fabric.

8. The inflatable cushion as in claim 7, wherein the single sheet of fabric and the second single sheet of fabric extend from a forward end of the inflatable cushion.

9. The inflatable cushion as in claim 8, further comprising another single sheet of fabric secured to another portion of the inflatable cushion wherein the first layer of cushion fabric is secured to the second layer of cushion fabric to define a seam disposed between a pair of inflatable cells disposed towards a rearward end of the inflatable cushion, wherein a portion of the another single sheet of fabric traverses and is tangent to a face of one of the pair of inflatable cells when they are inflated such that upon inflation of the pair of inflatable cells tension is created in the another single sheet of fabric.

10. The inflatable cushion as in claim 9, wherein the another single sheet of fabric is secured to an inboard side of the inflatable cushion.

11. The inflatable cushion as in claim 9, wherein the another single sheet of fabric is secured to an un-inflatable portion of the inflatable cushion disposed between the pair of inflatable cells and the at least one inflatable cell.

12. The inflatable cushion as in claim 7, wherein the single sheet of fabric is secured to a portion of the inflatable cushion wherein the first layer of cushion fabric is secured to the second layer of cushion fabric to define a seam disposed between the at least one inflatable cell and another inflatable cell of the inflatable cushion.

13. The inflatable cushion as in claim 7, wherein the second single sheet of fabric is secured to a portion of the inflatable cushion wherein the first layer of cushion fabric is secured to the second layer of cushion fabric to define a seam disposed between the at least one inflatable cell and another inflatable cell of the inflatable cushion.

14. The inflatable cushion as in claim 7, further comprising a vertical tether, wherein the single sheet of fabric is secured to the vertical tether.

15. The inflatable cushion as in claim 14, wherein the vertical tether is secured to an additional sheet of fabric sewn to the single sheet of fabric by a plurality of stitches to provide a larger surface area for securement of the vertical tether to the single sheet of fabric.

16. An airbag module for a vehicle, comprising:

an inflatable cushion, the inflatable cushion, comprising:

at least one inflatable cell proximate to an end of an inflatable portion of the inflatable cushion, the least one inflatable cell being defined by a first layer of cushion fabric secured to a second layer of cushion fabric; a single sheet of fabric secured to either the first layer or second layer of cushion fabric defining the at least one inflatable cell, the single sheet of fabric defining a non-inflatable portion of the inflatable cushion and wherein a portion of the single sheet of fabric traverses the at least one inflatable cell and is tangent to a face of the at least one inflatable cell when it is inflated such that upon inflation of the at least one inflatable cell tension is created in the single sheet of fabric; and an inflator for inflating the inflatable cushion; and wherein the face of the at least one inflatable cell is an inboard face of the inflatable cell and the inflatable cushion further comprises a second single sheet of fabric secured to either the first layer or second layer of cushion fabric defining the at least one inflatable cell, the second single sheet of fabric defining another non-inflatable portion of the inflatable cushion and wherein a portion of the second single sheet of fabric traverses the at least one inflatable cell and is tangent to an outboard face of the at least one inflatable cell when it is inflated such that upon inflation of the at least one inflatable cell tension is created in the second single sheet of fabric and wherein the single sheet of fabric and the second single sheet of fabric extend from a forward end of the inflatable cushion.

17. The airbag module as in claim 16, further comprising another single sheet of fabric secured to another portion of the inflatable cushion wherein the first layer of cushion fabric is secured to the second layer of cushion fabric to define a seam disposed between the first layer of cushion fabric and the second layer of cushion fabric proximate to an inflatable cell located at a rearward end of the inflatable cushion, wherein a portion of the another single sheet of fabric traverses the inflatable cell proximate to the rearward end of the inflatable cushion and is tangent to a face of the inflatable cell proximate to the rearward end of the inflatable cushion when it is inflated such that upon inflation of the inflatable cell tension is created in the another single sheet of fabric.

18. A method for providing tension to a non-inflatable portion of an inflatable cushion, comprising:
   securing a first layer of cushion fabric to a second layer of cushion fabric to define at least one inflatable cell proximate to an end of an inflatable portion of the inflatable cushion; and
   securing a single sheet of fabric secured to the inflatable cushion, the single sheet of fabric defining the non-inflatable portion of the inflatable cushion and wherein a portion of the single sheet of fabric completely traverses across a width of the at least one inflatable cell and is tangent to a face of the at least one inflatable cell when it is inflated such that upon inflation of the at least one inflatable cell tension is created in the single sheet of fabric and wherein the single sheet of fabric does not define the at least one inflatable cell.

19. The method as in claim 18, wherein another portion of the single sheet of fabric extends past a peripheral edge of the at least one inflatable cell.

20. The inflatable cushion as in claim 1, wherein another portion of the single sheet of fabric extends past a peripheral edge of the at least one inflatable cell.

\* \* \* \* \*